Oct. 23, 1951     R. L. GRIFFIN     2,572,472
CONVEYER UNLOADING APPARATUS

Filed March 10, 1949     5 Sheets-Sheet 2

Inventor
Roger L. Griffin
by Roberts, Cushman & Groves
attys.

Oct. 23, 1951 — R. L. GRIFFIN — 2,572,472
CONVEYER UNLOADING APPARATUS
Filed March 10, 1949 — 5 Sheets-Sheet 4

Inventor
Roger L. Griffin
by Roberts, Cushman & Groves
Att'ys.

Oct. 23, 1951   R. L. GRIFFIN   2,572,472
CONVEYER UNLOADING APPARATUS

Filed March 10, 1949   5 Sheets-Sheet 5

Inventor
Roger L. Griffin
by Roberts, Cushman & Grover
attys.

Patented Oct. 23, 1951

2,572,472

UNITED STATES PATENT OFFICE 2,572,472

CONVEYER UNLOADING APPARATUS

Roger L. Griffin, Marblehead, Mass., assignor to A. C. Lawrence Leather Company, Peabody, Mass., a corporation of Maine Application March 10, 1949, Serial No. 80,713

12 Claims. (Cl. 271—85)

This invention relates to unloading apparatus and more particularly to apparatus of the type for unloading leather from a conveyor.

Objects of this invention are to provide an unloading apparatus which will remove skins or similar objects from a conveyor, which is automatic and rapid in operation, which stacks the unloaded skins, which transfers the skins without whipping or fluttering thereof, which is adjustable for skins of different sizes, which does not damage the skins, which operates irrespective of irregularities or holes in the skins, which is trouble-free and requires a minimum of maintenance, and which advances the art generally.

In a broad aspect the invention contemplates conveyor unloading apparatus comprising a movable frame having one end pivotally connected to a base located adjacent the discharging end of the conveyor. The frame is normally positioned so that a plurality of fingers located at the other end of the frame intercept the path of the skins as they are moved through the conveyor. Control means are provided which are responsive to the presence of a skin on the conveyor adjacent the fingers to close the fingers to grip the skins and conjointly to connect driving means for moving the frame from the normal skin intercepting position to an unloading position. As the frame reaches the unloading position, the fingers are opened by the control means to drop the skins. The frame is subsequently returned being stopped in its normal position by the control means.

In another aspect the control means includes a light beam source positioned on one side of the conveyor belt so that the beam is intercepted by the passage of a skin through the conveyor. The correlated photoelectric cell is located adjacent the source on the same side of the conveyor, the light beam from the source being directed upon the cell by reflecting means positioned on the other side of the conveyor belt. With this arrangement the portion of the beam between the cell and the reflecting means is also intercepted by the passage of the skin, thereby insuring that an irregular skin or skins having holes therein will intercept either the direct or reflected beam to energize a time delay relay. After a time elapse sufficient to permit the skins to be conveyed into the fingers, the time delay relay completes a circuit for closing the fingers to grip the skin, and conjointly connects the driving means to move the frame to the unloading position at which position an adjustable unloading switch which interrupts the finger closing circuits opens thereby to drop the skins.

In a specific aspect the frame includes two side members each pivotally connected at its lower end to the base of the apparatus. The upper end of each member is pivotally connected to a correlated hanger. Disposed adjacent each of the side members is a parallel link likewise having its ends pivotally connected to the base and the hanger associated with the correlated side member. The distances between the pivoted connections of the links and the members respectively are made the same whereby the hangers remain substantially vertical as the frame is moved. A rotatable member carrying these fingers is journaled at its ends to the respective hangers. Also joining the hangers is a stationary gripping bar which cooperates with the fingers to seize the skins as the rotatable member is turned by fluid operating means, for example a cylinder wherein is a piston moved either by compressed air or oil under pressure. The fluid supply is controlled by a solenoid operated valve energized from a power supply by means of a magnetic switch operated by the photoelectric and time delay relays. The unloading switch opens the holding circuit of the magnetic switch thereby to de-energize the switch.

In another specific aspect the driving means includes a torque equalizing member having a crank arm located at each end thereof. Each of the arms is linked by a connecting rod with a respective side member of the frame whereby rotation of the torque member transmits forces of substantially equal magnitude to the respective side members thus minimizing distortion of the frame. The torque member is driven from the low speed shaft of a speed reducer having a crank connecting to a corresponding crank upon the torque member by means of a crank rod. The ratio of the effective lengths of the cranks is made such that one complete revolution of the low speed shaft results in an oscillatory rotation of the torque member so that the frame makes one complete oscillation between the normal and the unloading positions.

A feature of the invention is the coupling of an electric drive motor to the high speed input shaft of the speed reducer by means of a magnetically operated clutch brake. The circuit energizing the clutch is completed by the time delay relay thereby moving the frame from the normal skin intercepting position to the unloading position and back to the normal position. As the frame reaches the normal position, a limit switch operated by the speed reducer low speed shaft interrupts the circuit energizing the clutch thus stopping the frame. As the clutch releases the brake is engaged simultaneously. Another feature of the invention is the possibility of a direct connection of the driving motor to the input shaft of the speed reducer. With this arrangement the limit switch disconnects the motor from its power supply, overtravel of the frame being prevented by a plugging switch which applies reversed current to the motor during a portion of the interval between the disconnecting of the motor from the power supply by the limit switch and the stopping of the motor armature.

These and other objects, aspects and features will be apparent from the following detailed description of a preferred embodiment of this invention referring to drawings wherein Fig. 1 is a side elevation view of one embodiment of the invention with the frame in its normal position wherein the fingers intercept the path of the skins through the conveyor;

Figure 6:
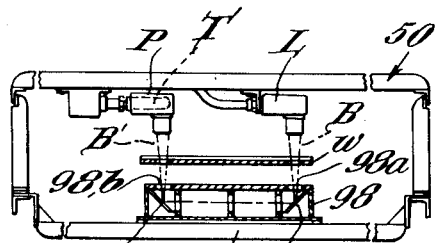
Fig. 6 is a partial section on line 6—6 of Fig. 1 showing the arrangement of the photoelectric relay.

The specific embodiment of the invention chosen for purposes of illustration is an unloader for removing skins from the end of the conveyor C (Fig. 1) having a plurality of spaced wires $w$ constituting a belt which moves the skins through a drying oven during the finishing process. Near the end of the conveyor each successive skin interrupts a light beam B (Figs. 6 and 8) of a photoelectric relay P whereby a timing circuit is energized which causes the fingers 11 to close as the skin is conveyed between the fingers and a gripping bar 12. The timing circuit simultaneously energizes driving means including an electric motor M (Figs. 1–3, 6 and 8) to move a frame 13 carrying the fingers to the unloading position shown in Fig. 3, in which position the fingers 11 are opened by an unloading switch $st$ (Fig. 4) to drop the skin over a horse H. The driving means subsequently returns the frame 13 to its normal position where it remains until the next succeeding skin interrupts the beam B whereupon the above described cycle is repeated.

The frame 13 comprises two side members such as the channels 19 (Figs. 1 and 3), the upper ends of which are pivotally connected to the respective hangers 17 by means of a shaft 18 which is journaled in the antifriction bearings 20. The hangers 17 are also joined by the stationary gripper rod 12 (Fig. 2) which cooperates with the fingers 11 to seize the skin and a rotatable member such as the shaft 14 which carries the fingers 11, the ends of the shaft 14 being rotatably supported by the hangers 17. The lower end of each of the channels 19 is pivotally connected to a respective web member 34 (Fig. 2) of a supporting base 30 (Figs. 1 and 3) by means of a shaft 35 the ends of which are journaled in the pillow blocks 31a and 31b respectively. The sides of the frame 13 are completed by the parallel links 32 disposed adjacent the respective side channels 19. Each of the links 32 comprises a rod 32b (Fig. 3) with a lower end pivotally connected to a pillow block 33 and an extension member 32a threadingly engaging an aperture in the upper end of the rod. Relative motion between the rod 32b and the extension 32a is prevented by a check nut 32c. The blocks 33 are mounted on the web members 34 abutting the blocks 31a, the distance between the effective centers thereof being determined by considerations discussed in detail below.

The extension member 32a (Figs. 1 and 3) has an eye in the end thereof wherein is secured the outer race of an antifriction bearing, the inner race of which bearing fits about a pin 27a carried by an arm 27 projecting normally from the upper end of the hanger 17 thereby to complete a pivotal connection between the parallel link 32 and the hanger. The engagement of the bearing member 32a in the threaded aperture of the rod 32b is adjusted so that the effective distances between the pivotal connections of link and the channel 19 are made the same. The distance between the center of the shaft 18 and the pin 27a and the distance between the effective centers of the pillow blocks 31 and 33 are also equal so that each side of the frame 13 forms a parallelogram. The bottom of each parallelogram is fixed in a horizontal plane by the pillow blocks 31 and 33, which are fastened to the base 30 so that the arm 27 also remains horizontal as the frame 13 is pivoted about the pillow blocks as will be described hereinafter. With the arm 27 remaining horizontal it is evident that the finger-supporting portion of the hanger 17 which is normal thereto will remain vertical irrespective of the pivotal movement of the frame 13.

Figure 1:
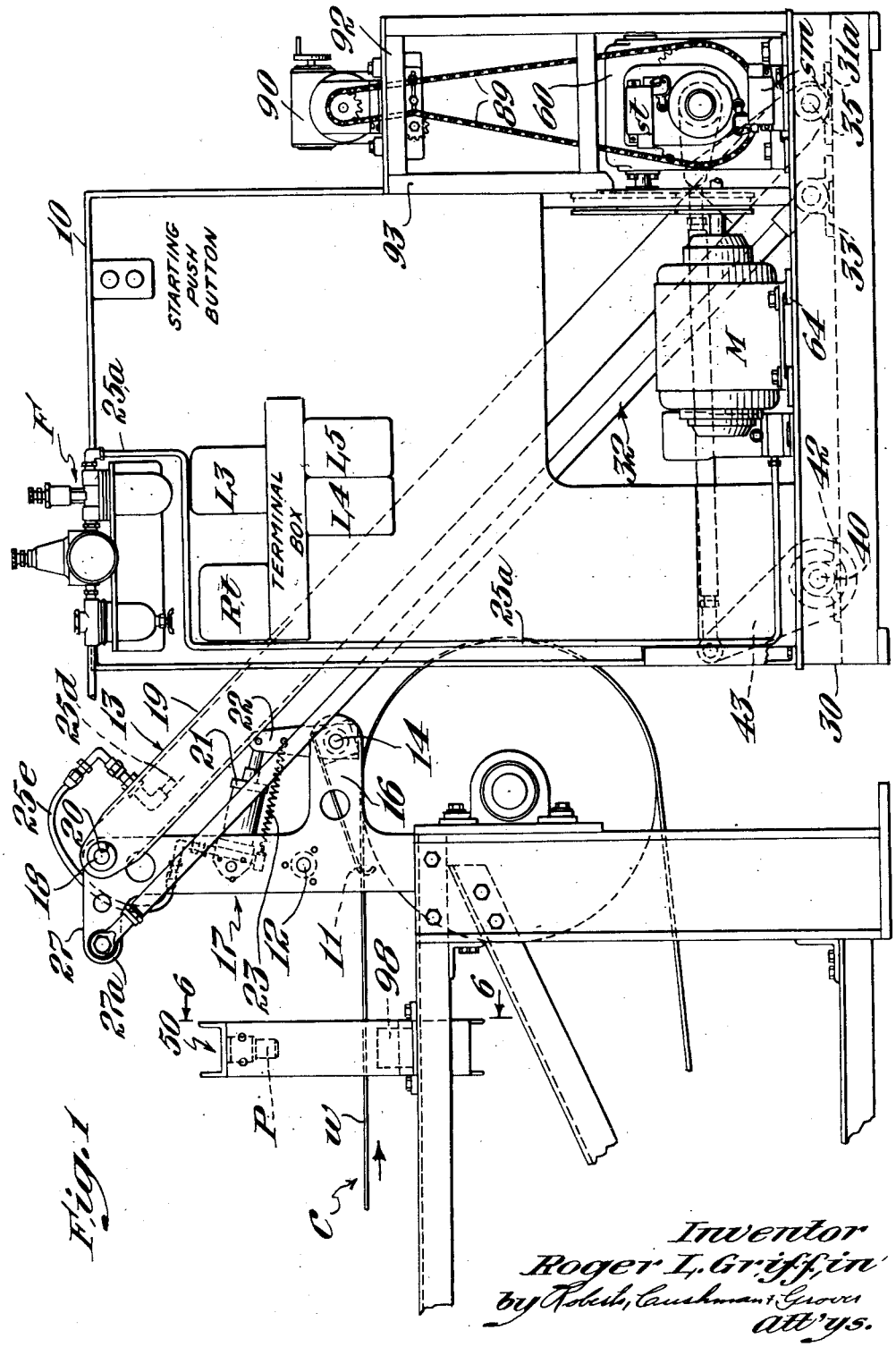

Each of the skin gripping fingers 11 comprises a strip of tempered steel or other elastic material fixed at one end to the rotatable shaft 14 and having a projecting end bent back to form a semicircle. The fingers 11 are spaced lengthwise of the shaft 14 so that the semicircular projecting ends thereof extend between the wires $w$ forming the conveyor belt when the frame 13 is in a normal position with the bottom of the hanger 17 resting upon the top of the end of the frame of the conveyor C as is shown in Fig. 1. The finger-carrying shaft 14 is journaled in bearings held by the arms 16 projecting normally from the lower ends of the respective hangers 17. The fingers 11 are brought into forcible contact with the corresponding rings 12a of rubber or other yieldable material disposed circumjacent the gripper rod 12 by the rotation of the shaft 14 operated by a piston and cylinder assembly 21 (Figs. 1 and 3) pivotally connected to the mid portion of one of the hangers 17. The piston rod is pivotally connected to one end of an arm 22, the other end of which is fixed to shaft 14. The admission of operating fluid, for example compressed air to the cylinder assembly 21, as will be described below, rotates the shaft 14 against the restoring force exerted by a spring 23.

Figure 2:
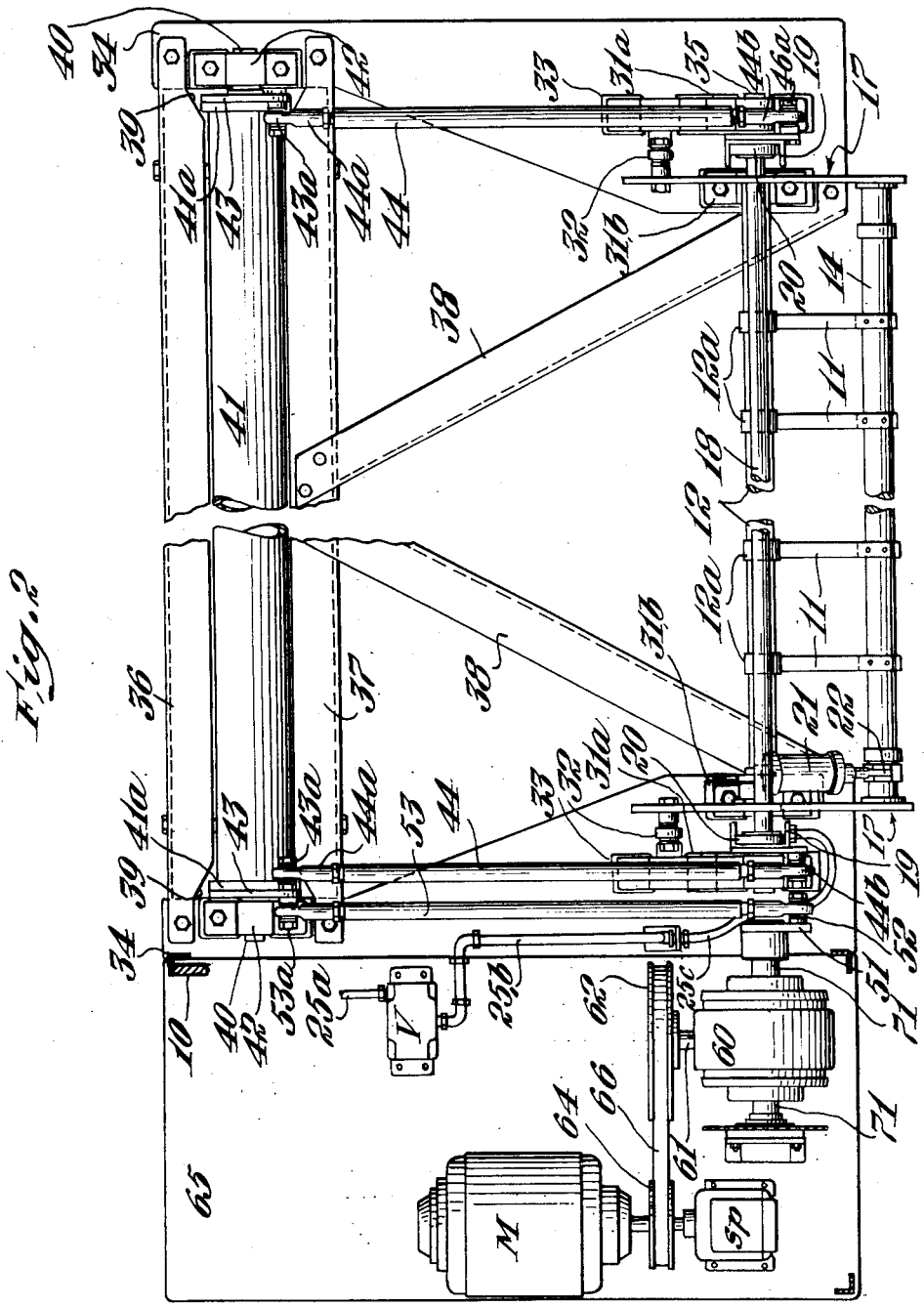
Fig. 2 is a plan view of the same embodiment showing the frame in a midposition between the normal and unloading positions.

Compressed air for operating the piston and cylinder assembly 21 from any conventional source of compressed air (not shown) is introduced through pressure regulating and filtering devices mounted at the top of a panel 10 and designated F in Fig. 1 and a conduit such as the tube 25a to a solenoid operated valve V (Fig. 2). The valve V is connected to the piston and cylinder assembly 21 by means of the conduits 25b, 25c, 25d and 25e, the conduits 25c and 25e being flexible so that they do not interfere with the movement of the frame 13. The valve V is ported so that the conduit 25b leading therefrom (and therefore the cylinder 21 is bled to atmosphere when the valve solenoid is not energized thus permitting the spring 23 to open the fingers 11. When the valve solenoid is energized by control means which will be described in detail hereinafter, the valve V connects the conduit 25b to the air source thereby operating the piston and cylinder assembly 21 to move the fingers 11 against the gripping bar 12.

The base 30 supporting the frame 13 comprises the two web members 34, mentioned above, the narrow ends of which are connected by two angle pieces 36 and 37 (Fig. 2). The opposite ends of the web members 34 which carry the pillow blocks 31a and 33 are braced by means of diagonally extending angle pieces 38 (Fig. 2) which connect with mid positions of the crosspiece 37.

A torque equalizing member, such as the hollow tube 41, is used to apply oscillating forces of substantially equal magnitude to the respective side channels 19 of the frame 13. The ends of the tube 41 are closed by the flanges 41a to which are secured the crank arms 43. Each crank arm 43 has an outwardly projecting pin 40 arranged coaxially with the tube 41 which is journaled in a pillow block 42 whereby the tube is rotatably supported between the angle pieces 36 and 37. The pillow blocks 42 are mounted on the web members 34, the angle pieces 36 and 37 being cut away as at 39 (Fig. 2) to make provisions therefor.

The projecting end of each crank arm 43 (Fig. 3) is connected with the correlated side channel 19 of the frame 13 by means of a connecting rod 44. The pivotal connection between the rod 44 and the crank arm 43 comprises a pin 43a engaging the inner race of an antifriction bearing secured in the end of an extension member 44a which is joined to the main portion of the rod by means of a threaded connection. A similar extension 44b at the opposite end of the rod 44 is pivotally connected by means of its bearing to a pin 46a of a crank portion 46 (Fig. 3) fastened to the side channel 19. The effective lengths of the crank arms 43 and 46 are the same so that oscillatory rotation of the torque equalizing tube 41 transmits an equivalent angular motion to the frame 13 as will be described in detail hereinafter.

The frame 13 is oscillated by driving means (Fig. 2) including the motor M mounted on a raised platform 65 located abutting one side of the frame base 30. The shaft of the motor M carries a pulley 64 for a V-belt drive 66. The mating pulley 62 is secured to one end of an input shaft 61 of a speed reducer 60 having a 40:1 gear ratio. One end of a low speed output shaft 71 of the speed reducer 60 rotates a cam 72 (Fig. 5) to operate the unloading switch st and a limit switch sm as will be described in detail below. The opposite end of the low speed shaft 71 carries a crank arm 51 (Fig. 2) pivotally connected by means of a pin 52 to one end of a crank rod 53 which is similar in construction to the connecting rods 44 described above. The opposite end of the crank rod 53 is pivotally connected to one torque member crank 43 by means of a pin 53a which is located upon the opposite side of the crank from the pin 43a. The ratio of the effective length of the crank 51 to the effective length of the crank 43 is such that one revolution of the low speed shaft 71 causes the frame 13 to make one 51.2 degrees oscillation from its normal or retracted position (Fig. 1).

Figure 4:
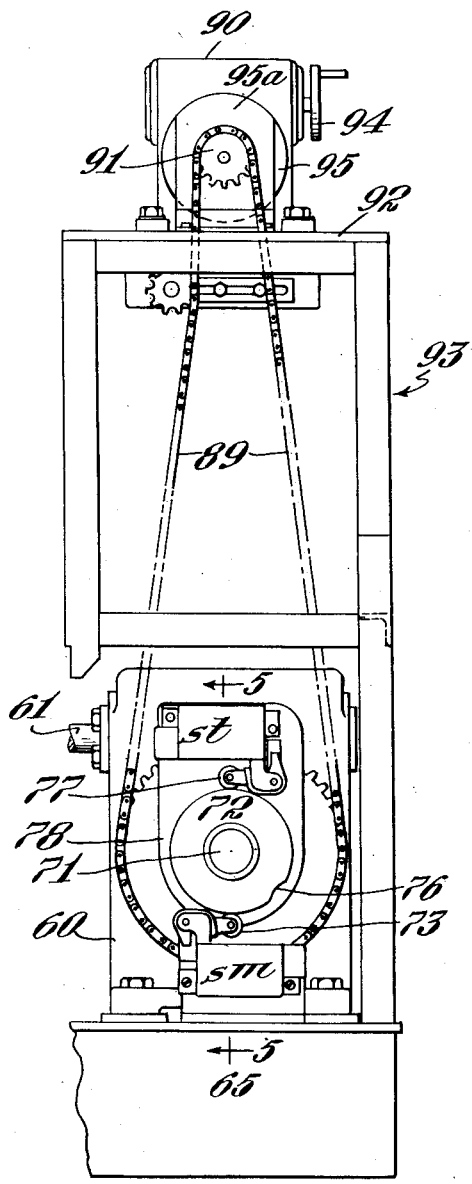
Fig. 4 is an enlarged fragmentary view of the driving mechanism showing the arrangement of the limit and unloading switches upon the end of the slow speed shaft of the speed reducer.
Figure 5:
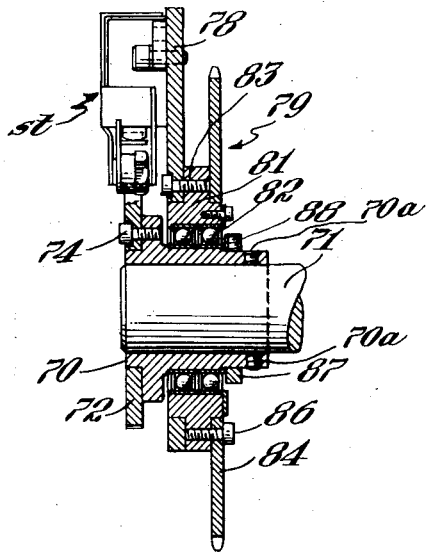
Fig. 5 is a section on line 5—5 of Fig. 4.

As is best shown in Fig. 4, the limit switch sm is fastened to the platform 65 so that its actuating mechanism such as the roller 73 contacts the surface of the cam 72 which is fastened to a flange extending from a sleeve 70 by means of the screws 74 (Fig. 5). The sleeve 70 is secured to the end of the slow speed shaft 71 by the screws 70a. The raised portion of the cam 72 maintains the contacts of switch sm in a closed position, the contacts opening only upon movement of the roller 73 into recessed cam portion 76. The recessed portion 76 is arranged angularly with respect to the position of the crank 51 so that the switch contacts open to disconnect the driving means (as described hereinafter) when the frame 13 is in its normal position shown in Fig. 1.

The unloading switch st is also operated by the cam 72, its contacts opening when a roller 77 descends into the recessed portion 76 thus de-energizing the solenoid valve V (as described below) so that the fingers 11 open to unload the skin carried thereby. The position of the frame 13 at which the unloading takes place is adjustable by varying the angular position of the switch st. Such variation is accomplished by fastening the switch st to a plate 78 (Fig. 5) of a rotatable assembly 79 which also includes a flanged annular member 81 coaxially maintained with respect to the sleeve 70 by the ball bearings 82. The plate 78 is fastened to one side of the flange of the annular member 81 by the screws 83. The opposite side of the flange supports a sprocket 84 which is fastened thereto by the screws 86. Axial movement of the rotatable assembly 79 with respect to the shaft 71 is prevented by the ring 87 which is secured to the sleeve 70 by a set screw 88.

Figure 3:
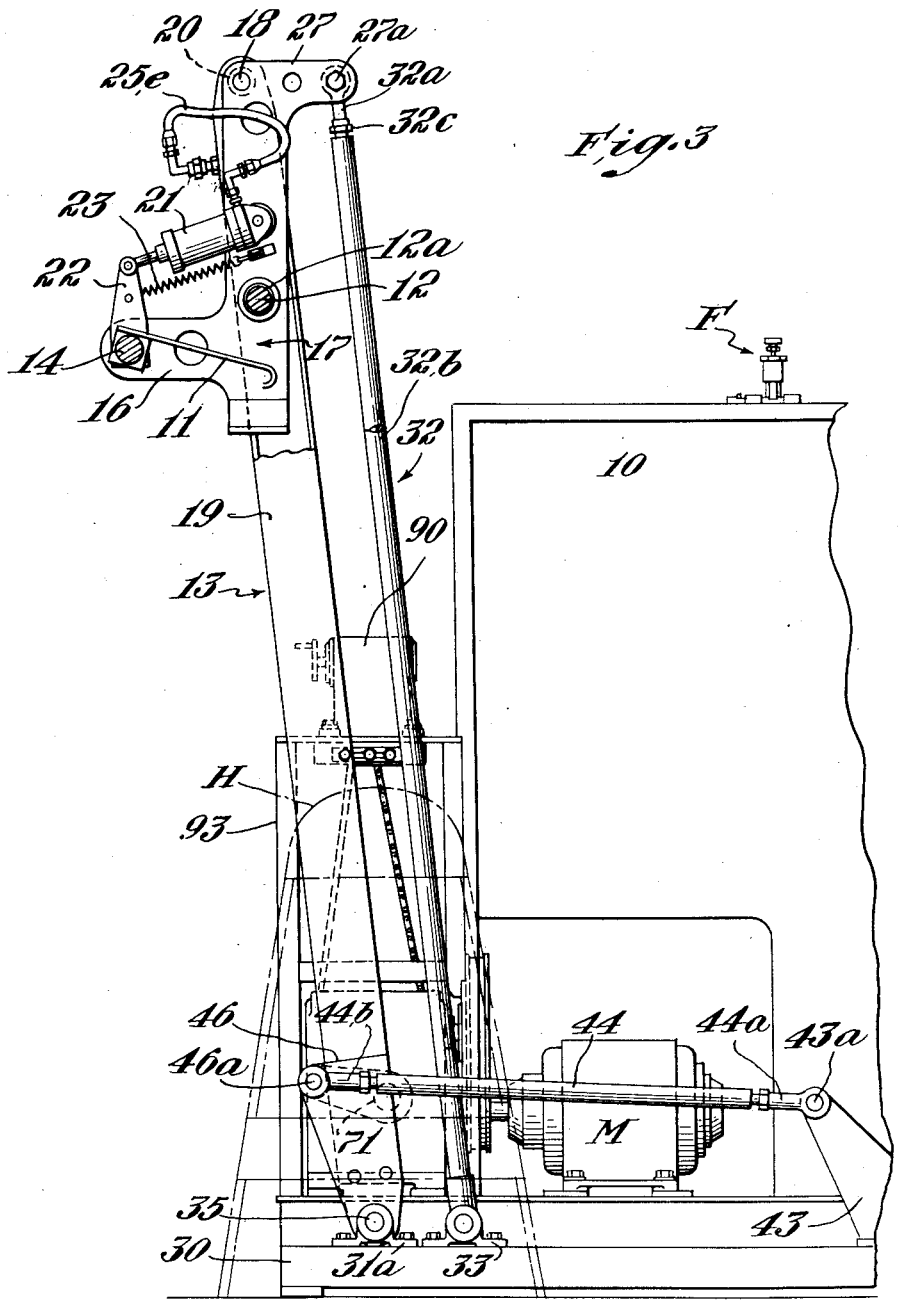
Fig. 3 is a side elevation with parts broken away and shown in section with frame moved to unloading position.

The sprocket 84 and therefore the switch st are rotated with respect to the shaft 71 by means of a chain 89 (Fig. 4) driven by a small sprocket 91. The sprocket 91 is carried on the output shaft of a reduction gear 90 which is supported on the top 92 of an angle iron frame 93 extending upwardly from the platform 65. The reduction gear 90 is operated manually by means of a hand wheel 94 mounted upon its input shaft. The periphery of a wheel 95 carried by the output shaft of the reduction gear 90 is graduated with a scale indicating various skin sizes. The turning of the hand wheel 94 so that the graduation correlated with a skin of a given size corresponds with the index mark at the top of a bracket 95a positions the unloading switch st to open the fingers 11 at the unloading position of the frame 13 which will stack the skins upon the horse H such as shown in Fig. 3.

The photoelectric relay P and its associated light source L (Fig. 6) are suspended over the spaced wires w constituting the conveyor belt upon a bridge 50 which is supported by the conveyor frame, as shown in Fig. 1. The light source L is located so that a light beam B (Fig. 6) is directed downwardly through the conveyor belt near one side thereof upon reflecting means which redirect the beam upwardly through the opposite side of the conveyor belt, as at B′ to impinge upon a phototube T in the photoelectric relay P. The reflecting means comprises two declivous mirrors 96 and 97 arranged at opposite ends of a housing 98 which is supported beneath the conveyor upon a crosspiece 99 extending between the sides of the conveyor frame. An aperture 98a is provided in the housing 98 above the mirror 96 so that the beam B can enter therethrough. A similar aperture 98b is located above the mirror 97 thereby allowing the beam B to be directed upon the photoelectric cell T. With the above arrangement the irregular skins or skins having holes therein will interrupt one or the other of the beam portions thereby insuring positive operation of the photoelectric relay P.

Figure 8:
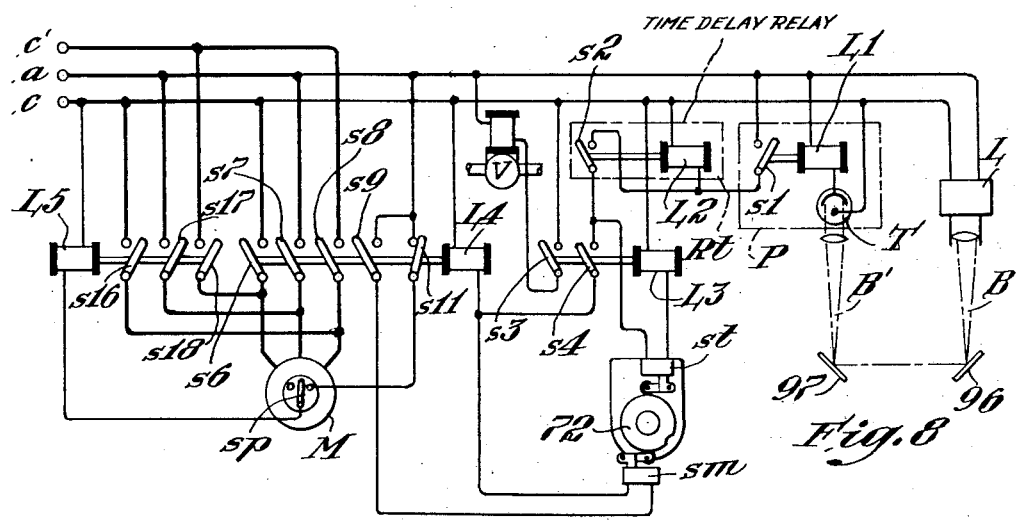
Fig. 8 is a wiring diagram of the embodiment shown in Fig. 2 incorporating the plugging switch.

The operation of the control means for the unloader can best be understood with reference to the wiring diagram shown in Fig. 8, wherein the photoelectric relay P is schematically shown as a solenoid L1 energized to open the normally closed contacts $s1$ whenever incident light from the source L impinges upon the photoelectric cell T whereby the tube is made electrically conductive. When a skin on the conveyor C interrupts either light beam portion B or B', the increase in the internal resistance of the photoelectric cell T, decreases the current flowing through the solenoid L1 so that the contacts $s1$ close to energize the time delay relay Rt from the terminals $a$ and $c$ of a three phase power source (not shown). It will be understood that more elaborate types of photoelectric relays, such as the General Electric Photoelectric Relay No. CR–7505–K100G–3 having an intermediate amplifier and normal open contacts which close upon the interruption of the light beam may also be used to energize the relay Rt.

The relay Rt may be any of the well known types of time delay relays but is preferably a General Electric Relay No. CR–7504–A3 wherein the bias upon a vacuum tube is changed by the discharge of a capacitor through a shunting resistor so that a solenoid L2 is energized after a predetermined time delay to close the contacts $s2$. The relay Rt is set to close its contacts $s2$ approximately 1 second after the beam B has been interrupted, thereby to allow the skin interrupting the beam to be conveyed into the grip of the fingers 11 as described heretofore. The normally open contacts $s2$ complete a circuit through the unloading switch $st$ to energize from the terminals $a$ and $c$, a solenoid L3 controlling two normally open contacts $s3$ and $s4$.

The closing of contact $s3$ energizes the solenoid operated valve V thereby to open the valve so that the fingers close as described above to seize the skin interrupting the light beam. The simultaneous closing of the contacts $s4$ completes a separate circuit through the relay contacts $s1$ and $s2$ to connect a solenoid L4 between the power source terminals $a$ and $c$ thereby closing the three normally open motor contacts $s6$, $s7$ and $s8$ and concomitantly closing and opening the normally open and normally closed interlocks $s9$ and $s11$ respectively. The closing of the interlock $s9$ completes a holding circuit also including the normally closed limit switch $sm$ between the terminal $a$ and the solenoid L4 which is in parallel with the original energizing circuit including the contacts $s2$ and $s4$ so that the solenoid remains energized regardless of the subsequent opening of the latter contacts.

The above closing of the motor M contacts $s6$, $s7$ and $s8$ applies power from the terminals $c$, $a$ and $c'$ of the three phase power source to the motor M whereby the motor causes the frame 13 to move from its normal position towards the unloading position by means of the drive described heretofore. As the unloading position of the frame 13 is reached the cam 72 located on the low speed shaft 71 of the speed reducer 60 causes the unloading switch $st$, which is set as described heretofore, to open thus de-energizing the solenoid L3. The resulting opening of contacts $s3$ de-energizes the valve V thereby bleeding the cylinder 21 to atmospheric so that the fingers 11 drop the skin upon the horse H. The conjoint opening of the contacts $s4$ does not de-energize the solenoid L4 because of the parallel holding circuit completed through the interlock $s9$ and the limit switch $sm$ so that the motor M continues to operate until the frame 13 is returned to the normal position.

As the frame 13 approaches the normal position, after completing one complete oscillation between its normal position and a position 51.2 degrees therefrom, the cam 72 opens the limit switch $sm$ to de-energize the solenoid L4 thus opening contacts $s6$, $s7$ and $s9$ to de-energize the driving motor M. The interlock $s11$ is concomitantly closed to energize a solenoid L5 from the terminals $a$ and $c$ by means of a circuit including a plugging switch $sp$ such as the General Electric switch CR–2962C whose contacts are maintained closed by the rotation of the motor shaft which is connected thereto as is shown in Fig. 1.

The energization of the solenoid L5 closes the contacts $s16$, $s17$ and $s18$ thereby reconnecting the motor M to the terminals $c$, $a$ and $c'$. It will be noted that the contacts $s16$ connect the power source terminal $c$ to the motor terminal which is connected to power source terminal $c'$ by the closing of the contacts $s8$, and the contacts $s18$ connect the power source terminal $c'$ to the motor terminal which is connected to the power source terminal $c$ by the contacts $s6$ i. e., the phase relationship of the motor M with respect to the power source is changed so that the motor torque opposes the rotation of the motor rotor thereby to lock the rotor whereby the frame 13 is stopped in the normal position. As the motor rotor decelerates to a predetermined rotational speed, the contacts of the plugging switch $sp$ open thereby de-energizing the solenoid L5 so that the contacts $s16$, $s17$ and $s18$ open to disconnect the power source so that the motor M does not reverse its rotation.

Figure 7:
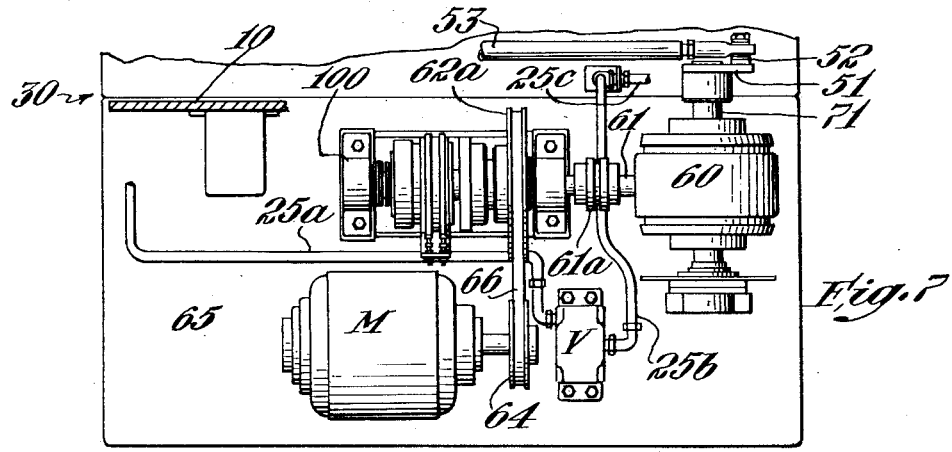
Fig. 7 is a fragmentary plan view of a driving mechanism of a second embodiment incorporating a magnetic clutch brake drive.
Figure 9:
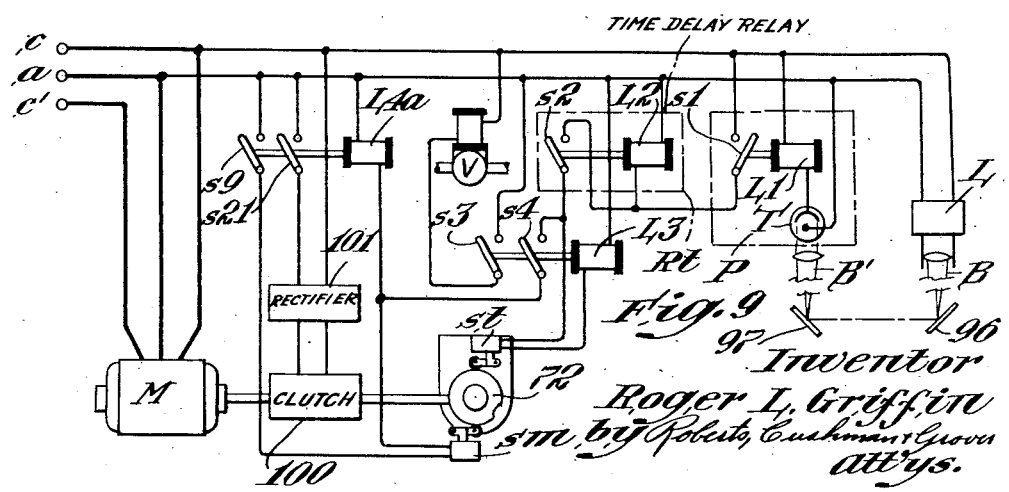
Fig. 9 is a wiring diagram of the embodiment shown in Fig. 7 incorporating the magnetic clutch brake.

In Fig. 7 is shown a second embodiment wherein the driving means incorporates a clutch 100 which is engaged magnetically by means of direct current supplied from a rectifier 101 (Fig. 9). The input shaft of the clutch 100 engages a pulley 62a driven from a mating pulley 64 on the shaft of the motor M by means of a V-belt drive 66. The clutch output shaft is linked with the input shaft 61 of the speed reducer 60 by means of a flexible coupling 61a. The output shaft 71 of the speed reducer 60 is connected to the frame 13 by the crank rod 53 in the same manner as described heretofore in connection with the embodiment shown in Fig. 2.

In this embodiment the motor M runs continuously being directly connected to the power source terminals $c$, $a$ and $c'$ as is shown in Fig. 9. The operation of the unloader is in this instance also initiated by the interruption of the light beam B. The photoelectric relay P and the time delay relay Rt are connected in the same manner to the solenoid valve V and the relay solenoids L3 and L4a as the corresponding elements which have been described in detail in connection with the wiring diagram in Fig. 8. In the embodiment in Fig. 9 the motor contacts $s16$, $s17$ and $s18$ and the normally closed interlock $s11$ have been eliminated the solenoid L4a controlling only the holding interlock $s9$ and a normally open contact $s21$.

The interruption of the light beam B closes the contacts $s1$ and after the predetermined time delay the contact s2 closes in the same manner as described above to energize the solenoid L3 through the unloading switch st. The resulting closing of the contacts s3 opens the solenoid valve V so that the fingers 11 grip the skin. The conjoint closing of the contacts s4 energizes the solenoid L4a, the interlock s9 and the limit switch sm again providing a holding circuit for the solenoid L4a. The concomitant closing of the contacts s21 energizes the magnetic clutch 100 through the rectifier 101 thereby engaging the clutch so that the frame 13 is moved from the normal position. At the unloading position the unloading switch st de-energizes the solenoid L3 and therefore the solenoid operated valve V so that the fingers 11 drop the skin over the horse H. As the frame 13 returns to its normal position the limit switch sm de-energizes the solenoid L5a thereby opening the contacts s21 to disengage the clutch thus stopping the frame 13 in the normal position.

It should be understood that the present disclosure is for the purpose of illustration only and that this invention includes all modifications and equivalents which fall within the scope of the appended claims.

I claim:

1. Apparatus for removing sheets of material from a conveyor comprising a base adjacent to said conveyor, a movable frame having a part pivotally connected to said base, a plurality of fingers adapted to grip sheet material spaced from the pivoted part of said frame, said frame being normally positioned so that said fingers intercept the path of said sheet material, driving means for oscillating said frame between the normal and an unloading position, and control means including detecting means responsive to the approach of each sheet to close said fingers to grip the sheet material and conjointly to connect said driving means to move said frame to the unloading position, said control means opening said fingers to drop said sheet material when the frame reaches the unloading position and subsequently returning the frame to the normal position thereby to complete the operating cycle.

2. Apparatus for removing skins from a conveyor comprising a base located adjacent the end of said conveyor, a movable frame having one end pivotally connected to said base, a plurality of fingers adapted to grip said skins located at the other end of said frame, said frame being normally positioned so that said fingers intercept the path of said skins, driving means for oscillating said frame between the normal and an unloading position, control means including detecting means responsive to the presence of a skin upon said conveyor and time delay means energized by said detecting means thereby to close said fingers to grip the skin and conjointly to connect said driving means to move said frame to the unloading position after the elapse of a preselected time interval, tripping means for opening said fingers to drop said skin when the frame reaches the unloading position, and disconnecting means for stopping the driving means upon the return of the frame to the normal position thereby to complete the operating cycle.

3. Apparatus for removing skins from a conveyor comprising a base located adjacent the end of said conveyor, a movable frame having one end pivotally connected to said base, a plurality of fingers adapted to grip said skins located at the other end of said frame, said frame being normally positioned so that said fingers intercept the path of said skins, driving means for oscillating said frame between the normal and an unloading position, a light beam source positioned on one side of said conveyor so that the beam is intercepted by the passage of a skin through the conveyor, a photoelectric cell located adjacent said source on the same side of the conveyor, reflecting means for directing the beam upon said cell, the portion of said beam between said cell and said reflecting means also being intercepted by the passage of the skin through the conveyor, and relay means responsive to the interruption of the beam by the presence of a skin upon said conveyor for closing said fingers to grip the skin and conjointly connecting said driving means to move said frame to the unloading position, and switching means for opening said fingers to drop said skin when the frame reaches the unloading position and subsequently returning the frame to the normal position thereby to complete the operating cycle.

4. Apparatus for removing skins from a conveyor comprising a base located adjacent the end of said conveyor, a movable frame having one end pivotally connected to said base, a plurality of fingers adapted to grip said skins located at the other end of said frame, said frame being normally positioned so that said fingers intercept the path of said skins, driving means for oscillating said frame between the normal and an unloading position, control means including a photoelectric relay having a photoelectric cell and an energizing light beam so located with respect to said conveyor that the presence of a skin adjacent said fingers interrupts said beam to operate said relay, a time delay relay energized by said photoelectric relay to close said fingers after a time delay sufficient to permit said skin to be conveyed into said fingers, said driving means simultaneously connected by said time delay relay to move said frame to the unloading position, an adjustable unloading switch for opening said fingers to drop said skin when the frame reaches the unloading position, and a limit switch for disconnecting the driving means upon the return of the frame to the normal position thereby to complete the operating cycle.

5. Apparatus for removing skins from a conveyor comprising a base located adjacent the end of said conveyor, a movable frame having one end pivotally connected to said base, a plurality of fingers adapted to grip said skins located at the other end of said frame, said frame being normally positioned so that said fingers intercept the path of said skins, driving means including an electric motor, a speed reducer having a high speed input shaft coupled to said motor and a low speed output shaft, a crank rod connecting the low speed output shaft to the frame whereby the frame is oscillated between the normal and an unloading position, and control means responsive to the presence of a skin upon said conveyor for closing said fingers to grip the skin and conjointly connecting said driving means to move said frame to the unloading position, said control means opening said fingers to drop said skin when the frame reaches the unloading position and subsequently returning the frame to the normal position to complete the operating cycle.

6. Apparatus for removing skins from a conveyor comprising a base located adjacent the end of said conveyor, a movable frame having one end pivotally connected to said base, a plurality of fingers adapted to grip said skins located at the other end of said frame, said frame being normally positioned so that said fingers intercept the path of said skins, driving means including an electric motor for oscillating said frame between the normal and an unloading position, control means responsive to the presence of a skin upon said conveyor for closing said fingers to grip the skin and conjointly connecting said driving means to move said frame to the unloading position, an unloading switch for opening said fingers to drop said skin when the frame reaches the unloading position, and a plugging switch for momentarily applying a reverse current to the motor upon the return of the frame to the normal position.

7. Apparatus for removing skins from a conveyor comprising a base located adjacent the end of said conveyor, a movable frame having one end pivotally connected to said base, a plurality of fingers adapted to grip said skins located at the other end of said frame, said frame being normally positioned so that said fingers intercept the path of said skins, driving means including a clutch for oscillating said frame between the normal and an unloading position, control means responsive to the presence of a skin upon said conveyor for closing said fingers to grip the skin and conjointly engaging said clutch so that said driving means moves said frame to the unloading position, an unloading switch for opening said fingers to drop said skin when the frame reaches the unloading position, and a limit switch for disengaging said clutch to disconnect said driving means upon the return of the frame to the normal position.

8. Apparatus for removing skins from a conveyor comprising a base located adjacent the end of said conveyor; a movable frame having two side members, the lower ends of which are pivotally connected to said base; a plurality of fingers adapted to grip said skins located at the upper end of said frame; said frame being normally positioned so that said fingers intercept the path of said skins, driving means including a torque equalizing member having a crank arm located at each end thereof, a connecting rod linking each arm with a respective side member whereby rotation of the torque member transmits forces of substantially equal magnitude to the respective side members thus minimizing distortion of the frame, a speed reducer having a low speed output shaft with a crank arm attached thereto, and a crank rod linking said shaft crank arm with one of the crank arms of said torque member, the ratio of the effective lengths of the crank arms being such that one revolution of the low speed shaft rotates the torque member so that said frame is oscillated between the normal position and an unloading position; and control means responsive to the presence of a skin upon said conveyor for closing said fingers to grip the skin and conjointly connecting said driving means to move said frame to the unloading position, said control means opening said fingers to drop said skin when the frame reaches the unloading position and subsequently returning the frame to the normal position thereby to complete the operating cycle.

9. Apparatus for removing skins from a conveyor comprising a base located adjacent the end of said conveyor; a movable frame each of whose sides includes a hanger, a side member having its upper end pivotally connected to said hanger and a lower end pivotally connected to said base, and a parallel link likewise having its ends pivotally connected to said hanger and said base respectively disposed adjacent each of said respective side member, the distances between the pivoted connections of said link and side member being the same whereby the hangers remain substantially vertical as the frame is moved; a plurality of fingers adapted to grip said skins disposed between said hangers to intercept the path of said skins when the frame is in a normal position; driving means for oscillating said frame between the normal and an unloading position; and control means responsive to the presence of a skin upon said conveyor for closing said fingers to grip the skin and conjointly connecting said driving means to move said frame to the unloading position, said control means opening said fingers to drop said skin when the frame reaches the unloading position and subsequently returning the frame to the normal position thereby to complete the operating cycle.

10. Apparatus for removing skins from a conveyor comprising a base located adjacent the end of said conveyor, a movable frame having one end pivotally connected to said base, two hangers pivotally supported respectively from the opposite sides of said frame, a gripping bar connecting said hangers, a rotatable member having its ends journaled in the respective hangers, a plurality of fingers carried by said rotatable member, fluid operated means for rotating said member whereby the ends of said fingers contact said gripping bar, said frame being normally positioned so that the skins are successively conveyed between said fingers and the gripping bar, driving means for oscillating said frame between its normal position and an unloading position, and control means responsive to the presence of a skin upon said conveyor for closing said fingers to grip the skin and conjointly connecting said driving means to move said frame to the unloading position, said control means opening said fingers to drop said skin when the skin reaches the unloading position and subsequently returning the frame to the normal position thereby to complete the operating cycle.

11. Apparatus for removing skins from a conveyor comprising a base located adjacent the end of said conveyor; a movable frame each of whose sides includes a hanger, a side member having its upper end pivotally connected to said hanger and a lower end being pivotally connected to said base, and a parallel link likewise having its ends pivotally connected to said hanger and said base respectively disposed adjacent each of said respective side members, the distances between the pivoted connections of said link and side member being the same whereby the hangers remain substantially vertical as the frame is moved; a gripping bar connecting said hangers; a rotatable member having its ends journaled in the respective hangers; a plurality of fingers carried by said rotatable member; fluid operated means for rotating said member whereby the ends of said fingers contact said gripping bar, said frame being normally positioned so that the skins are successively conveyed between said fingers and the gripping bar; driving means including an electric motor; a torque equalizing member having a crank arm located at each end thereof; a connecting rod linking each arm with a respective side member whereby rotation of the torque member transmits forces of substantially equal magnitude to the respective side members thus minimizing distortion of the frame; a speed reducer having a high speed input shaft coupled to said motor and a low speed output shaft with a crank arm attached thereto; a crank rod linking said shaft crank arm with one of the crank arms of said torque member, the ratio of the effective lengths of the crank arms being such that one revolution of the low speed shaft rotates the torque member so that said frame is oscillated between the normal and an unloading position; and control means including a light beam source positioned on one side of said conveyor so that the beam is intercepted by the passage of a skin through the conveyor, a photoelectric cell located adjacent said source on the same side of the conveyor, reflecting means for directing the beam upon said cell, the portion of said beam between said cell and said reflecting means also being intercepted by the passage of the skin through the conveyor, a time delay relay energized by said photoelectric relay to close said fingers after delay sufficient to permit said skin to be conveyed into said fingers, said driving motor being simultaneously energized by said time delay relay to move said frame to the unloading position, an adjustable unloading switch operated by said low speed shaft for interrupting the fluid supply to said fingers thereby to drop said skin when the frame reaches the unloading position, a limit switch also operated by said shaft to disconnect the motor upon the return of the frame to the normal position, and a plugging switch for momentarily applying a reverse current to the motor to prevent over-travel of the frame.

12. Apparatus for removing skins from a conveyor comprising a base located adjacent the end of said conveyor; a movable frame each of whose sides includes a hanger, a side member having its upper end pivotally connected to said hanger and a lower end thereof being pivotally connected to said base, and a parallel link likewise having its ends pivotally connected to said hanger and said base respectively disposed adjacent each of said respective side members, the distances between the pivoted connections of said link and side member being the same whereby the hangers remain substantially vertical as the frame is moved; a gripping bar connecting said hangers; a rotatable member having its ends journaled in the respective hangers; a plurality of fingers carried by said rotatable member; fluid operated means for rotating said member whereby the ends of said fingers contact said gripping bar, said frame being normally positioned so that the skins are successively conveyed between said fingers and the gripping bar; driving means including an electric motor; a torque equalizing member having a crank arm located at each end thereof; a connecting rod linking each arm with a respective side member whereby rotation of the torque member transmits forces of substantially equal magnitude to the respective side members thus minimizing distortion of the frame; a speed reducer having a low speed output shaft with a crank attached thereto and a high speed shaft; a magnetic clutch brake for coupling said high speed shaft to said motor, a crank rod linking said shaft crank arm with one of the crank arms of the torque member, the ratio of the effective lengths of the crank arms being such that one revolution of the low speed shaft rotates the torque member so that said frame is oscillated between the normal and an unloading position; and control means including a light beam source positioned on one side of said conveyor so that the beam is intercepted by the passage of a skin through the conveyor, a photoelectric cell located adjacent said source on the same side of the conveyor, reflecting means for directing the beam upon said cell, the portion of said beam between said cell and said reflecting means also being intercepted by the passage of the skin through the conveyor, a time delay relay energized by said photoelectric relay to close said fingers after delay sufficient to permit said skin to be conveyed into said fingers, said clutch being simultaneously engaged by said time delay relay to couple said motor thereby to move said frame to the unloading position, an adjustable unloading switch operated by said low speed shaft for interrupting the fluid supply to said fingers thereby to drop said skin when the frame reaches the unloading position, and a limit switch also operated by said shaft to disengage the clutch.

ROGER L. GRIFFIN.

REFERENCES CITED

The following references are of record in the file of this patent:

UNITED STATES PATENTS

| Number | Name | Date |
| --- | --- | --- |
| 313,864 | Harlow | Mar. 17, 1885 |
| 2,277,846 | Couch | Mar. 31, 1942 |